United States Patent

Kostuch et al.

[11] Patent Number: 6,139,313
[45] Date of Patent: Oct. 31, 2000

[54] FURNACE HAVING TOROIDAL FLUID FLOW HEATING ZONE

[75] Inventors: Jacek Antoni Kostuch, Cornwall, United Kingdom; Christopher Edward Dodson, Ontario, Canada

[73] Assignee: Mortimer Technology Holdings Limited, Berkshire, United Kingdom

[21] Appl. No.: 09/214,951

[22] PCT Filed: Jul. 23, 1997

[86] PCT No.: PCT/GB97/02000

§ 371 Date: Oct. 4, 1999

§ 102(e) Date: Oct. 4, 1999

[87] PCT Pub. No.: WO98/03256

PCT Pub. Date: Jan. 29, 1998

[30] Foreign Application Priority Data

Jul. 23, 1996 [GB] United Kingdom .................... 9615418
Jul. 23, 1996 [GB] United Kingdom .................... 9615425

[51] Int. Cl.[7] ......................................................... F27B 15/02
[52] U.S. Cl. .............................. 432/58; 432/77; 432/101; 34/179
[58] Field of Search ................................. 432/58, 77, 97, 432/99, 101, 212, 219; 34/68, 179, 181, 231; 110/245, 346, 347

[56] References Cited

U.S. PATENT DOCUMENTS

| 3,889,393 | 6/1975 | Thomas et al. ............................ 432/99 |
| 4,025,293 | 5/1977 | Beckenbach .............................. 432/97 |
| 4,076,493 | 2/1978 | Gardner .................................... 432/77 |
| 4,559,719 | 12/1985 | Dodson .................................... 432/58 |

FOREIGN PATENT DOCUMENTS

| 0 068 853 | 1/1983 | European Pat. Off. . |
| 0 172 530 | 2/1986 | European Pat. Off. . |
| 2 262 776 | 9/1975 | France . |
| 2 119 279 | 11/1983 | United Kingdom . |
| 2 203 670 | 10/1988 | United Kingdom . |
| 2 219 521 | 12/1989 | United Kingdom . |
| WO 92/02289 | 2/1992 | WIPO . |
| WO 92/21439 | 12/1992 | WIPO . |
| WO 94/19122 | 9/1994 | WIPO . |
| WO 95/17982 | 7/1995 | WIPO . |

*Primary Examiner*—Pamela Wilson
*Assistant Examiner*—Gregory A. Wilson
*Attorney, Agent, or Firm*—Joseph R. Kelly; Westman, Champlin & Kelly, P.A.

[57] ABSTRACT

There is described a furnace of the kind in which a toroidal fluid flow heating zone may be established. The furnace includes a chamber (7a) in which there is provided an inner block and a ring of angled blades (21) between the inner block and an inner wall of the chamber (7a). Means (4a) is provided for delivering fluid into the chamber in such a way that the fluid passes through gaps between the blades and establishes a toroidal fluid flow heating zone in the chamber above the ring of angled blades. Means (23) is also provided for injecting feed particulate material into the chamber in a region where the toroidal fluid flow heating zone is to be established. In one arrangement, means (49) is additionally provided for injecting fuel into the chamber in a region above the ring of angled blades so that the region in the chamber at which the heating zone is established is elevated above the ring of angled blades. In another arrangement, means (33) is provided for cooling the inner block.

38 Claims, 2 Drawing Sheets

FURNACE HAVING TOROIDAL FLUID FLOW HEATING ZONE

BACKGROUND OF THE INVENTION

The present invention relates to furnaces. In particular, it relates to furnaces of the kind in which a toroidal fluid flow heating zone is established. Such furnaces are described, for example, in U.S. Pat. No. 4,479,920.

Generally, a hot gas is passed through gaps between angled blades or vanes in a ring of blades or vanes provided in an operational chamber of the furnace. The blade ring is formed in an annular gap between the wall of the chamber and a central block, for example, an upwardly pointing conical portion, located on the axis of the chamber. Gas flow is caused to follow a rotary path in a doughnut shaped region around the block and in individual swirls within the rotary path. This ensures efficient residence of, and heat transfer to, material, such as particulate material, to be heated in the gas flow.

SUMMARY OF THE INVENTION

Furnaces of the said kind may be used for the heat treatment of particulate material. However, it has been found that where the feed particulate material comprises material which fluxes at temperatures at which it is to be heat treated, unwanted build up of the fluxed material occurs in various parts of the furnace, especially on or around the ring of angled blades and on or around the central block. As illustrated hereinafter, such build up can cause a back pressure to occur which impedes the particulate feed system and/or extinguishes the burner employed to provide the hot gas. Furthermore, such build-up of material requires removal before the furnace can be suitably operated again. This necessitates terminating the use of the furnace and undesirably limits the duration of that use. Such limitations make prior art furnaces of the above kind unsuitable for some continuous heat treatment processes.

According to a first aspect of the present invention there is provided a furnace of the kind in which a toroidal fluid flow heating zone may be established, the furnace including a chamber in which there is provided an inner block, and a ring of angled blades between the inner block and an inner wall of the chamber; means for delivering fluid into the chamber in such a way that the fluid passes through gaps between the blades and establishes a toroidal fluid flow heating zone in the chamber above the ring of angled blades; means for injecting feed particulate material into the chamber in a region where the toroidal fluid flow is to be established; and means for injecting fuel into the chamber in a region above the ring of angled blades such that the region in the chamber at which the heating zone in the chamber is established is elevated above the ring of angled blades.

The fuel injected by such means may be reacted with a reacting fluid delivered into the chamber in the usual manner through the gaps between the angled blades. For example, the fuel may be a combustible fuel and the reacting fluid may be air or an oxygen containing fluid, whereby, if sufficient oxygen is available at a suitable elevated temperature, spontaneous reaction of the fuel and oxygen takes place to provide the required heating zone. This may constitute a plasma in part of, for example, in the upper part of, the toroidal flow.

One advantage of this aspect of the present invention is that the delivery of excessively hot gas to the operational chamber via the ring of angled blades can be avoided. This avoids damage to the ring of angled blades and neighbouring components and also avoids unwanted accretion of material being processed on the hot surfaces. By contrast, in prior art furnaces where a rapid throughput of material is required to be processed, the energy demands of the furnace are considerably raised and hot gas at a temperature as high as 1600° C. to 1700° C. might need to be delivered via the ring of angled blades. Such high temperatures can cause damage to the ring.

In a preferred embodiment of the present invention the reacting fluid may be delivered at a temperature in the range from 700° C. to 900° C., and especially from 700° C. to 800° C. to provide a heating zone temperature of from 750° C. to 1050° C., for example 920° C. to 1020° C.

The means for injecting fuel may comprise a ring of fuel inlet tubes extending from a common joint or housing to which input fuel is applied via an inlet pipe, the inlet tubes ending in the operational chamber. Preferably, the tubes are upwardly pointed at their ends in the chamber thereby providing jets of fuel which are injected into the main fluid flow to provide combustion to form the required heating zone by, for example, the said plasma.

The main fluid flow may comprise air which is preheated before delivery into the operational chamber through the gaps in the ring of angled blades. The heated air flow may be provided by combining with an excess supply of air a burning pre-heating fuel and exhaust gases produced by burning the pre-heating fuel.

The fuel which may be employed to provide pre-heating of the air flow and the fuel which may be injected directly into the operational chamber in the furnace may be the same or different fuels. Preferably, the two fuels are the same.

The fuel employed in the operation of the furnace may be natural gas. It could alternatively comprise fuel oil, pulverised coal, or combustibles obtained from lignitic materials.

The temperature inside the operational chamber may be monitored. The rate of delivery of the fuel and/or the reacting fluid may be controlled by adjustment according to variations of the monitored temperature from a desired norm representing the required heating zone temperature.

In a method of use of the furnace according to the present invention the feed material may comprise a particulate material of a kind which fluxes at temperatures above about 800° C. For example, the feed material may comprise mineral particles, for example, clays such as kaolin, calcium carbonate or mica to be flash calcined using the furnace. The furnace way be adjusted so that the temperature of calcination is in the range from 750° C. to 1050° C., for example, from 920° C. to 1020° C.

By carrying out the heat treatment of such a material in a furnace embodying the present invention it is possible to avoid the aforementioned problems of damage to the ring of angled blades and the unwanted build-up of feed material and material produced therefrom contributing to the requirement to stop the process and clean the operational chamber of the furnace.

It has been found that in the heat treatment of particulate materials of the kind which flux when heated, the above described problem of the unwanted build up of feed material and material produced by heating such material, which occurs in prior art furnaces of the kind producing a toroidal fluid flow, is caused by the following effect. Various critical internal surfaces in the furnace tend to overheat and thereby cause feed particulate material to adhere to such surfaces by fluxing/sintering at such surfaces. This problem is especially prevalent at the ring of angled blades. The furnace according to the first aspect of the present invention beneficially prevents such overheating occurring, especially in the region of, and adjacent to, the ring of angled blades. The application of fuel through a further inlet means allows the heating zone provided by the toroidal fluid flow to be moved upwardly away from the ring of blades and the region of the chamber wall and the inner block immediately above the ring of blades thereby preventing overheating of the surfaces of these members.

Although the problem of over heating is especially prevalent at the ring of angled blades, it is also significant in the region of the inner block.

Thus, according to a second aspect of the present invention there is provided a furnace of the kind in which a toroidal fluid flow heating zone may be established, the furnace including a chamber in which there is provided an inner block, and a ring of angled blades between the inner block and an inner wall of the chamber; means for delivering fluid into the chamber in such a way that the fluid passes through gaps between the blades and establishes a toroidal fluid flow heating zone in the chamber above the ring of angled blades; means for injecting feed particulate material into the chamber in a region where the toroidal fluid flow is to be established; and means for cooling the inner block.

The means for cooling the block may conveniently comprise a radiation heat shield in the form of a shroud provided over the inner block. Conveniently, there may also be means for delivering coolant gas to the shroud to be applied over the surface of the block and to cool the shroud. The means for delivering coolant gas may comprise a gas inlet pipe or pipes extending from a region outside the furnace to the shroud. The gas inlet pipe(s) may extend from a region above or below or to the side of the shroud. The coolant gas may, for example, comprise air.

The inner block may, as in the prior art, comprise a portion whose cross-sectional area decreases along its axis in a direction away from the ring of angled blades. For example, the block may comprise an upwardly pointing conical or frusto-conical portion. The portion may be made of refractory material. The shroud may comprise a cover of similar shape, for example, an upwardly pointing frusto-conical portion spaced from the block. The means for delivering coolant gas to the shroud may include a coolant gas delivery pipe extending downwardly to the top of the shroud, for example, from the top of the furnace or extending upwardly, for example, from the bottom of the furnace.

In a region above the ring of angled blades, the chamber may have a wall having a frusto-conical portion which is connected at its narrower end to a product outlet pipe. Such an arrangement allows the use of steps or ledges on which accumulation of solid particulate material, or fluxed material formed therefrom, to be avoided.

The furnace according to the second aspect of the present invention beneficially prevents overheating occurring at the inner block. The shroud provides a radiation heat shield for the inner block and also allows cooling of the inner block by delivery of coolant gas for application over the surface of the inner block.

The coolant gas, such as air, provides an insulating layer between the shroud, which may be made, for example, of stainless steel, and the inner block, which may be made, for example, of stainless steel or of refractory material. The coolant gas also serves to remove any conducted heat from the shroud thus improving its function as a radiation shield.

In addition, the operational chamber enclosure may lead to a product exit chamber and may be provided with a conical shape having a smooth profile with no internal ledges or low velocity zones which facilitates transfer of product material after heat treatment in the operational chamber of the furnace without significant accretion on the walls.

These measures ensure that the temperature of the critical surfaces inside the operational chamber of the furnace are kept below the sintering temperature of the feed particulate material to be treated in the furnace thereby avoiding significant accretion of material on such surfaces.

BRIEF DESCRIPTION OF THE DRAWINGS

Embodiments of the present invention will now be described byway of example with reference to the accompanying drawings in which.

DETAILED DESCRIPTION OF THE INVENTION

Figure 1:
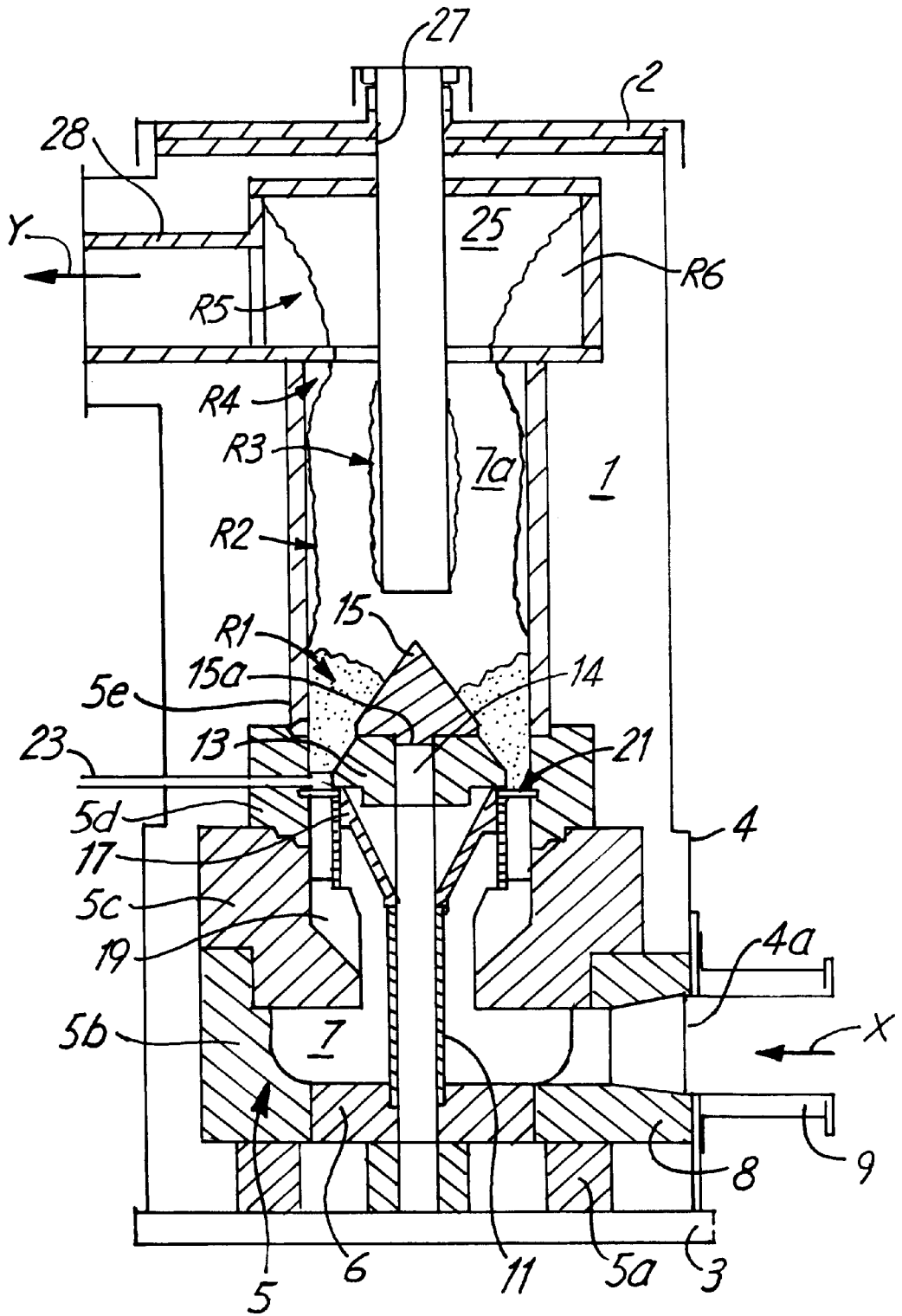
FIG. 1 is a cross-sectional side elevation of a prior art furnace of the kind producing a toroidal fluid flow heating zone.

A prior art furnace having a fluid flow heating zone of the toroidal kind is shown in FIG. 1. An enclosure 1 has a top 2, a base 3 and a side wall 4. A structure 5 made of refractory material comprising stacked annular portions 5a, 5b, 5c, 5d and 5e is supported by the base 3. An annular refractory portion 6 is provided between the portions 5a and 5b and an annular refractory portion 8 is provided between the portions 5a, 5b and 5c and covers an opening 4a in the side wall 4 whereby a passage 7 is provided inside the structure 5, the passage 7 communicating with a pipe 9 fitted to the side wall 4 at the opening 4a.

A tubular support 11 extends upwardly from the portion 6 through the passage 7. The support 11 carries a frusto-conical refractory portion 13 having an internal axial bore 14 and a refractory portion 15 located on top of the portion 13 by a portion 15a which engages within the top of the bore 14. A support 17 is attached to the tubular support 11 near its upper end and to a flange 19 extending into the passage 7 from the portion 5c. A ring 21 of angled blades is provided in the narrow gap between the lower end of the portion 13 and the outer portion 5d. The blades are of the form described in U.S. Pat. No. 4,479,920. The ring 21 is supported between the portion 5d and the support 17.

The uppermost refractory portion 5e in the structure 5 is fitted to an outlet chamber 25 whereby the chamber 7a communicates with the outlet chamber 25. An outlet pipe 28 extends from the outlet chamber 25. An inlet pipe 27 extends from the top 2 of the enclosure 1 through the chamber 25 and extends into the chamber 7a.

In use of the furnace shown in FIG. 1, hot gas from a burner (not shown) at a temperature required to establish heating in the chamber 7a is delivered into the passage 7 via the pipe 9. The gas passes through the gaps between the blades of the ring 21. A toroidal hot gas flow is thereby established near the ring 21 in the chamber 7a. Material to be heat treated in the furnace is introduced via the inlet pipe 27 into the heating zone provided by the toroidal flow. The powdered product formed by this process is eventually (after a residence time typically of a few seconds in the heating zone) transferred into the chamber 25 from the chamber 7a and is extracted by a cyclone (not shown) attached to the outlet pipe 28 where product solid material is separated from output gases.

During the use of the furnace shown in FIG. 1 for the calcining of kaolin powder at a temperature of above 800° C., for example, at 950° C., it has been found that unwanted deposits of material formed from the feed kaolin built up in various regions of the furnace, especially in the regions labelled R1, R2, R3, R4, R5 and R6 shown in FIG. 1.

Figure 2:
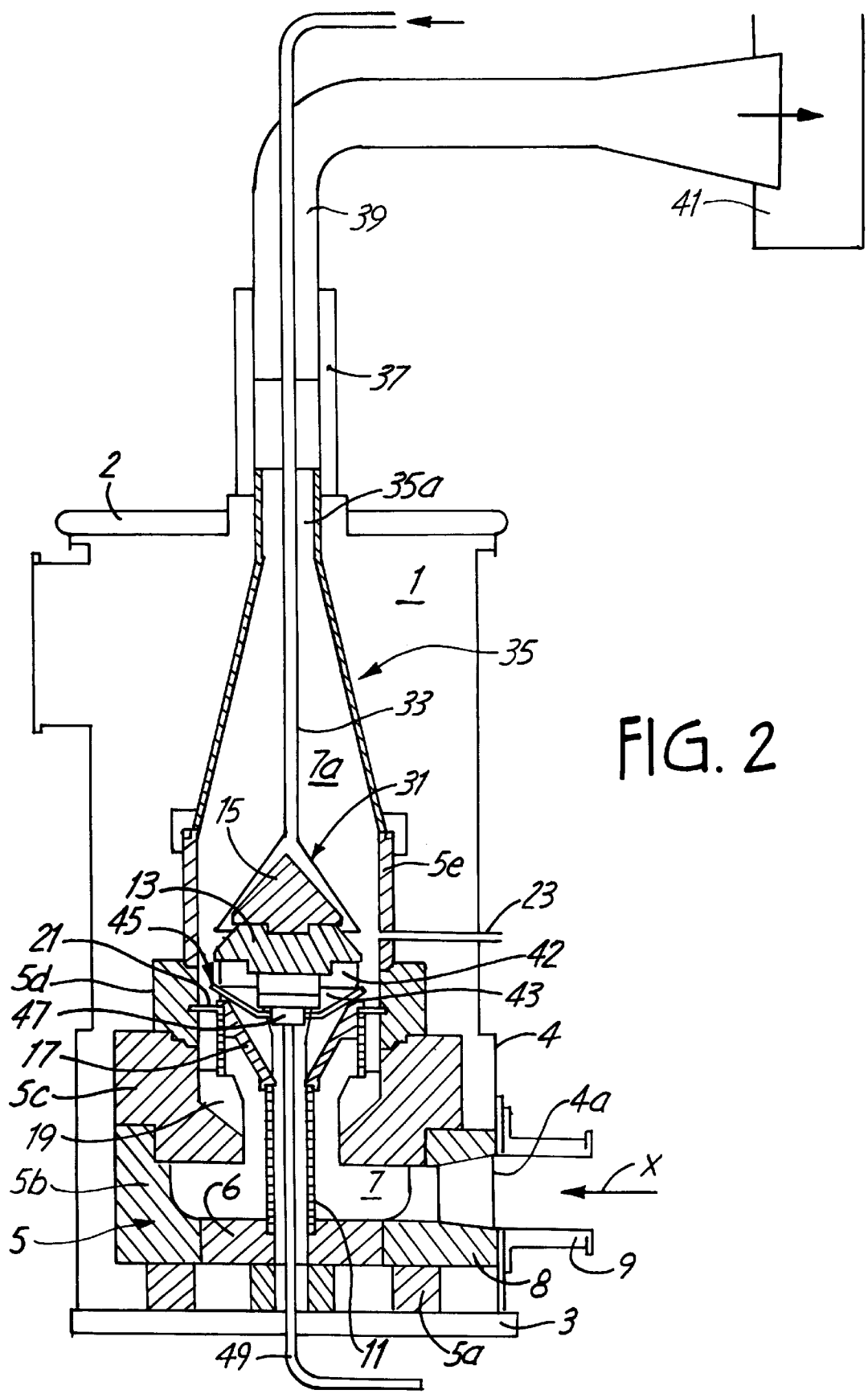
FIG. 2 is a cross-sectional side elevation of a furnace of the kind producing a toroidal fluid flow heating zone and embodying the present invention.

FIG. 2 shows a furnace embodying the present invention for producing a fluid flow heating zone of the toroidal kind. In FIG. 2 items which are similar to items in the furnace shown in FIG. 1 have been accorded like reference numerals.

In FIG. 2, an inverted conical shroud 31 is provided to cover the conical refractory portion 15 and part of the surface of the portion 13 below it. An inlet tube 33 extends downwardly along the axis of the enclosure 1 and enters the shroud 31. The uppermost portion 5e is shortened and a conical enclosure wall 35 extending from the top of the portion 5e is formed around the upper chamber 7a.

The upper end of the enclosure wall 35 has a tubular neck 35a which is fitted through the top 2 of the enclosure 1 into a tubular connector 37 outside the enclosure 1. An outlet pipe 39 is also fitted into the connector 37. The pipe 39 leads to a cyclone 41.

The upper part of the inlet tube 33 extends through the interior of part of the pipe 39, and the connector 37 and the neck 35a into the conical enclosure 35.

The portion 13 in FIG. 2 has no bore and is supported by blocks 42, 43 which are stainless steel support rings provided between the support 17 and portion 13. A ring of fuel inlet tubes 45 (of which only two are shown in FIG. 2) is provided beneath the blocks 42, 43. The tubes 45 project upwardly at their inner ends into the chamber 7a above the ring 21. The tubes 45 are connected at a central joint 47 to which in turn is connected a single inlet pipe 49 extending through the base 3, portion 6 and tubular support 11.

A series of feed material inlet tubes 23 (only one of which is shown) is provided. The tubes 23 are spaced circumferentially around the wall 4 and are fitted through the wall 4 and the portion 5d to enter the chamber 7a.

In use of the furnace shown in FIG. 2, reacting fluid, for example, hot air, is delivered into the passage 7 in the direction of the arrow X at a temperature below that required to provide a heating zone in the chamber 7a, for example, at a temperature of 750° C. to 800° C. Where the reacting fluid is air, the air may be heated by burning fuel in a burner (not shown) and allowing the burning fuel and hot exhaust gases produced thereby to be combined with the air flow to be heated.

The hot fluid passes through the gaps between blades of the ring 21 and thereby forms a toroidal flow above the ring 21. Fuel is delivered along the inlet pipe 49 and is injected as jets into the chamber 7a via the connector 47 and tubes 45. The fuel undergoes a spontaneous reaction with the reacting fluid in the chamber 7a thereby providing a plasma heating zone in the toroidal flow. This causes the location in the chamber 7a at which the heating zone is established to be elevated to a region clear of the narrow gap between the portion 5d and the base of the portion 13 and the blocks 42 and 43 thereby avoiding overheating of the blades of the ring 21 and the surfaces adjacent to the ring 21. Overheating of the ring 21 and adjacent surfaces is also avoided because the reacting fluid is delivered at a temperature of, for example, 750° C. to 800° C. less than the 1500° C. to 1600° C. required in some processes by the use of the furnace of FIG. 1.

The fuel used to preheat the reacting fluid may be the same as the fuel delivered into the chamber 7a via the tubes 45 and may, for example, comprise natural gas.

Particulate material is injected via the inlet tubes 23 into the plasma heating zone established in the toroidal flow. Coolant gas is delivered down the inlet pipe 33 to the shroud 31 and is applied over the surface of the portion 15 and part of the portion 13. The coolant gas prevents overheating of the portions 13 and 15 and also of the shroud 31 and thereby eliminates a local hot surface on the block 15 on which accretion of particulate material can occur.

The treated particulate material, after a suitable residence in the chamber 7a, which is typically less than 0.1 seconds, is drawn upwardly through the conical enclosure 35 and into the outlet pipe 39. This product is extracted and separated from the gas stream containing it by the cyclone 41.

Significant overheating and build up of solid material from the particulate material being treated in the furnace shown in FIG. 2 does not occur because of the differences in construction and operation of the furnace of FIG. 2.

The avoidance of excessively hot surfaces and internal steps and ledges in the operational chamber 7a and the product extraction arrangement avoids the accretion of material on such surfaces and the collection of deposits on such ledges unlike the chamber 25 in the prior art furnace of FIG. 1.

As a result heat treatment processes may be operated using the furnace shown in FIG. 2 in a continuous manner without the need for frequent cleaning of deposited material from inside the chambers of the furnace as with the prior art furnace of FIG. 1.

The temperature in the chamber 7a enclosed by the enclosure wall 35 may be monitored by, for example, a thermocouple (not shown), fitted to the inside of the wall 35, and variations of the temperature from a suitable norm may be employed as control signals to adjust the rate of delivery of fuel to the chamber via the fuel inlet tubes 45.

What is claimed is:

1. A furnace of the kind in which a toroidal fluid flow heating zone may be established, the furnace including a chamber in which there is provided an inner block, and a ring of angled blades between the inner block and an inner wall of the chamber; means for delivering fluid into the chamber in such a way that the fluid passes through gaps between the blades and establishes a toroidal fluid flow heating zone in the chamber above the ring of angled blades; means for injecting feed particulate material into the chamber in a region where the toroidal fluid flow heating zone is to be established; and means for injecting fuel into the chamber in a region above the ring of angled blades such that the region in the chamber at which the heating zone is established is elevated above the ring of angled blades.

2. A furnace as claimed in claim 1 and further comprising means for cooling the inner block.

3. A furnace as claimed in claim 2, wherein the means for cooling the inner block comprises a radiation heat shield in the form of a shroud provided over the inner block.

4. A furnace as claimed in claim 3, wherein the furnace also includes means for delivering coolant gas to the shroud to be applied over the surface of the inner block.

5. A furnace as claimed in claim 4, wherein the means for delivering coolant gas comprises a coolant gas delivery pipe extending to the shroud from a region outside the furnace.

6. A furnace as claimed in claim 3, wherein the inner block comprises a conical or frusto-conical portion and the shroud comprises a cover of similar shape.

7. A furnace as claimed in claim 1, wherein the fuel injecting means includes a ring of circumferentially spaced fuel inlet tubes.

8. A furnace as claimed in claim 7, wherein the fuel inlet tubes are connected to a common joint or housing connected to a common fluid inlet delivery pipe.

9. A furnace as claimed in claim 7, wherein the fuel inlet tubes project upwardly into the chamber.

10. A furnace as claimed in claim 1, wherein the furnace includes a source of hot fluid which reacts with the fuel in the chamber.

11. A furnace as claimed in claim 10, wherein said source includes a heater for heating the fluid before delivery to the chamber.

12. A furnace as claimed in claim 11, wherein the heater includes means for burning fuel to pre-heat the fluid to be delivered to the chamber.

13. A furnace as claimed in claim 10, wherein the hot fluid is delivered into the chamber at a temperature lower than the heating zone required to be established inside the chamber.

14. A furnace as claimed in claim 13, wherein the temperature of the chamber is monitored and the rate of delivery of one or both of the fuel and the reacting fluid- is adjusted according to temperature variations from a predetermined temperature.

15. A furnace as claimed in claim 10, wherein the reacting fluid comprises hot air or oxygen and the fuel comprises a fuel capable of combustion in the chamber in the hot air or oxygen.

16. A furnace as claimed in claim 15, wherein the fuel comprises natural gas.

17. A furnace as claimed in claim 1, wherein the inner block comprises refractory material and has a cross-sectional area which decreases along its axis in a direction away from the ring of angled blades.

18. A furnace as claimed in claim 1 wherein the chamber has a wall having a frusto-conical portion leading without internal steps or ledges to a product outlet pipe.

19. A method of flash calcination of clays such as Kaolin, Calcium Carbonate or Mica at temperatures in the range from 750° C. to 1050° C. using a furnace as claimed in claim 1.

20. A furnace of the kind in which a toroidal fluid flow heating zone may be established, the furnace including a chamber in which there is provided an inner block, and a ring of angled blades between the inner block and an inner wall of the chamber; means for delivering hot fluid into the chamber in such a way that the hot fluid passes through gaps between the blades and establishes a toroidal fluid flow heating zone in the chamber above the ring of angled blades; means for injecting feed particulate material into the chamber in a region where the toroidal fluid flow heating zone is to be established; and means for cooling the inner block.

21. A furnace as claimed in claim 20 and further comprising means for injecting fuel into the chamber in a region above the ring of angled blades.

22. A furnace as claimed in claim 21, wherein the fuel injecting means includes a ring of circumferentially spaced fuel inlet tubes.

23. A furnace as claimed in claim 22, wherein the fuel inlet tubes are connected to a common joint or housing connected to a common fluid inlet delivery pipe.

24. A furnace as claimed in claim 22, wherein the fuel inlet tubes project upwardly into the chamber.

25. A furnace as claimed in claim 20, wherein the furnace includes a source of hot fluid which reacts with the fuel in the chamber.

26. A furnace as claimed in claim 25, wherein said source includes a heater for heating the fluid before delivery to the chamber.

27. A furnace as claimed in claim 26, wherein the heater includes means for burning fuel to pre-heat the fluid to be delivered to the chamber.

28. A furnace as claimed in claim 25, wherein the hot fluid is delivered into the chamber at a temperature lower than the heating zone required to be established inside the chamber.

29. A furnace as claimed in claim 28, wherein the temperature of the chamber is monitored and the rate of delivery of one or both of the fuel and the reacting fluid is adjusted according to temperature variations from a predetermined temperature.

30. A furnace as claimed in claim 25, wherein the reacting fluid comprises hot air or oxygen and the fuel comprises a fuel capable of combustion in the chamber in the hot air or oxygen.

31. A furnace as claimed in claim 30, wherein the fuel comprises natural gas.

32. A furnace as claimed in claim 20, wherein the means for cooling the inner block comprises a radiation heat shield in the form of a shroud provided over the inner block.

33. A furnace as claimed in claim 32, wherein the furnace also includes means for delivering coolant gas to the shroud to be applied over the surface of the inner block.

34. A furnace as claimed in claim 33, wherein the means for delivering coolant gas comprises a coolant gas delivery pipe extending to the shroud from a region outside the furnace.

35. A furnace as claimed in claim 32, wherein the inner block comprises a conical or frusto-conical portion and the shroud comprises a cover of similar shape.

36. A furnace as claimed in claim 20, wherein the inner block comprises refractory material and has a cross-sectional area which decreases along its axis in a direction away from the ring of angled blades.

37. A furnace as claimed in claim 20, wherein the chamber has a wall having a frusto-conical portion leading without internal steps or ledges to a product outlet pipe.

38. A method of flash calcination of clays such as Kaolin, Calcium Carbonate or Mica at temperatures in the range from 750° C. to 1050° C. using a furnace as claimed in claim 20.

* * * * *